United States Patent

Shimizu et al.

(10) Patent No.: US 9,592,643 B2
(45) Date of Patent: Mar. 14, 2017

(54) APPARATUS FOR MANUFACTURING LENS ARRAY AND METHOD OF MANUFACTURING LENS ARRAY

(71) Applicant: FUJI XEROX CO., LTD., Tokyo (JP)

(72) Inventors: Keishi Shimizu, Kanagawa (JP); Shin Yasuda, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 428 days.

(21) Appl. No.: 14/192,042

(22) Filed: Feb. 27, 2014

(65) Prior Publication Data

US 2014/0346690 A1 Nov. 27, 2014

(30) Foreign Application Priority Data

May 27, 2013 (JP) ................ 2013-110947

(51) Int. Cl.
*B29D 11/00* (2006.01)

(52) U.S. Cl.
CPC .. *B29D 11/00336* (2013.01); *B29D 11/00298* (2013.01); *B29D 11/00951* (2013.01)

(58) Field of Classification Search
CPC ........ B29D 11/00336; B29D 11/00298; B29D 11/00951
See application file for complete search history.

(56) References Cited

U.S. PATENT DOCUMENTS

| 6,373,635 B1 | 4/2002 | Fujimoto et al. |
| 8,845,314 B2 * | 9/2014 | Yasuda ............... B29C 47/0021 425/115 |
| 9,149,977 B2 * | 10/2015 | Shimizu ........... B29D 11/00009 |

FOREIGN PATENT DOCUMENTS

| CN | 1287276 A | 3/2001 |
| JP | A-2003-011350 | 1/2003 |
| JP | A-2008-051855 | 3/2008 |
| JP | 2008-287235 A | 11/2008 |
| JP | A-2009-116011 | 5/2009 |
| JP | A-2010-211082 | 9/2010 |
| JP | A-2011-002489 | 1/2011 |

OTHER PUBLICATIONS

Sep. 2, 2016 Office Action issued in Chinese Patent Application No. 201410083871.4.

* cited by examiner

*Primary Examiner* — Mathieu Vargot
(74) *Attorney, Agent, or Firm* — Oliff PLC

(57) ABSTRACT

An apparatus for manufacturing a lens array includes a first lens forming unit that has a plurality of blades forming partition walls on a polymer substrate on which a parallax image is formed and a plurality of nozzles discharging a polymer, a detecting unit that detects a position of the parallax image, and a scanning control unit that adjusts a scanning start position of the first lens forming unit based on the position of the parallax image detected by the detecting unit and controls forming of the partition walls by the blades and discharging of the polymer to a region between the partition walls through the nozzle on a surface of the polymer substrate on which the parallax image is formed.

16 Claims, 14 Drawing Sheets

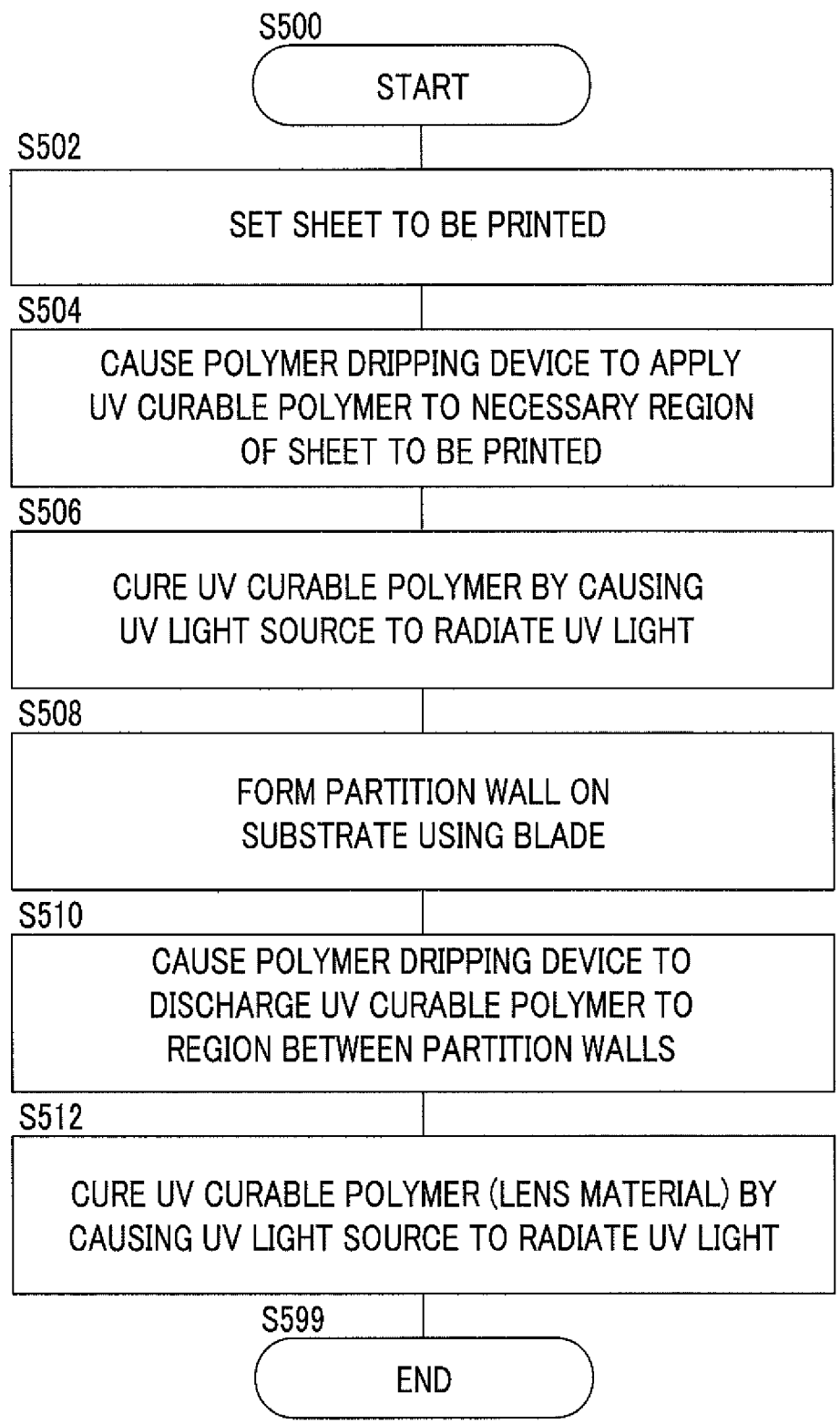

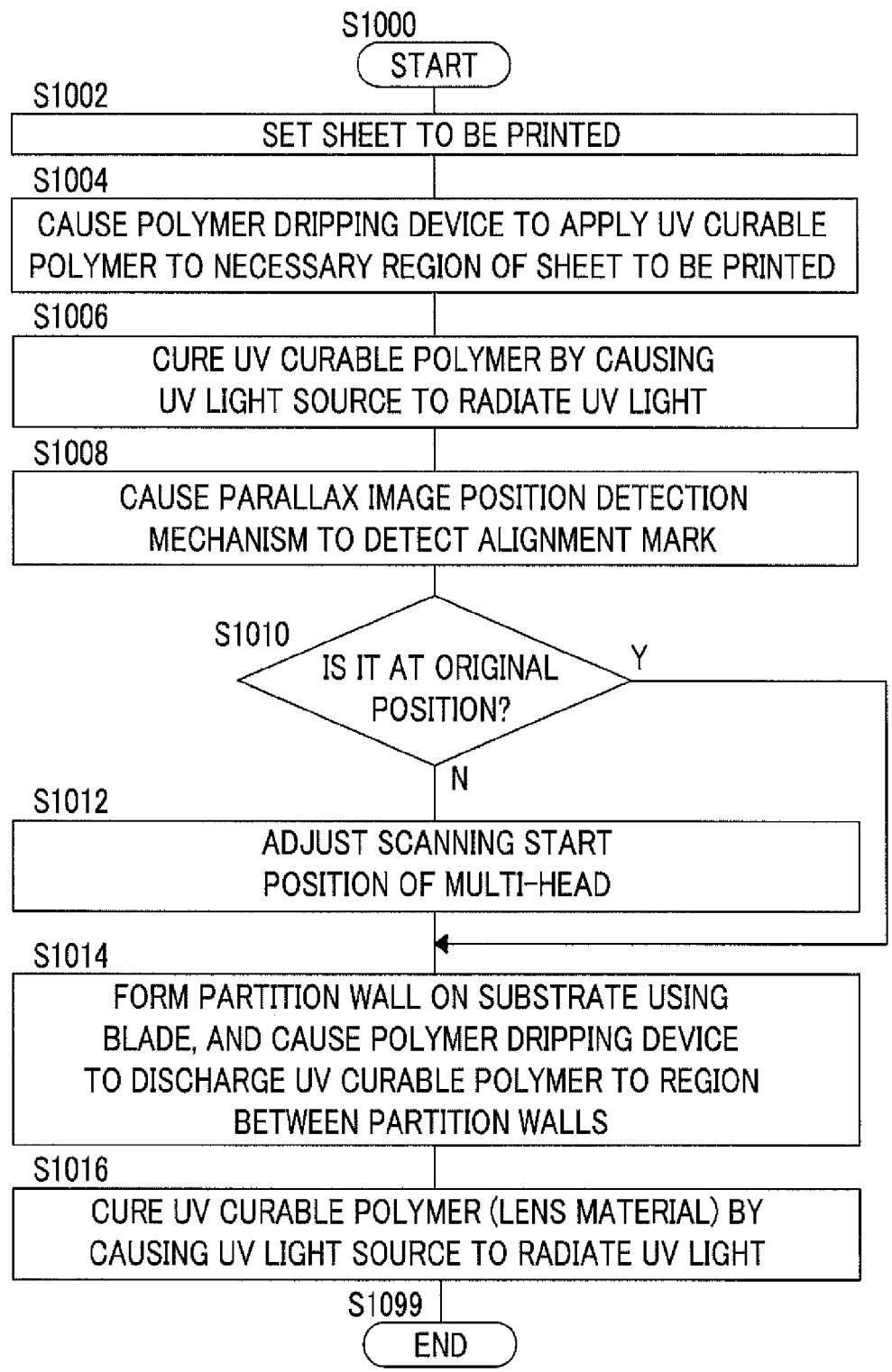

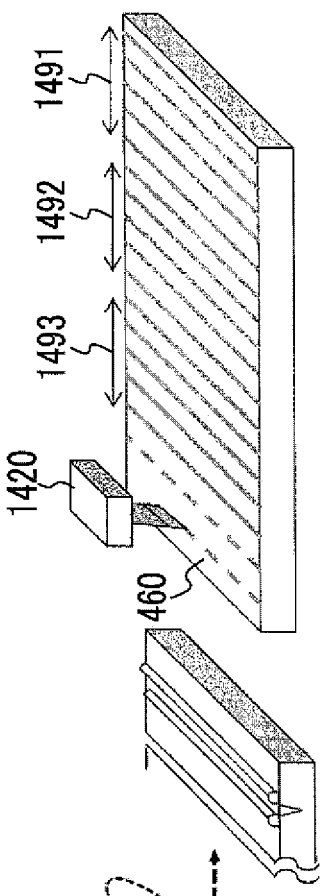
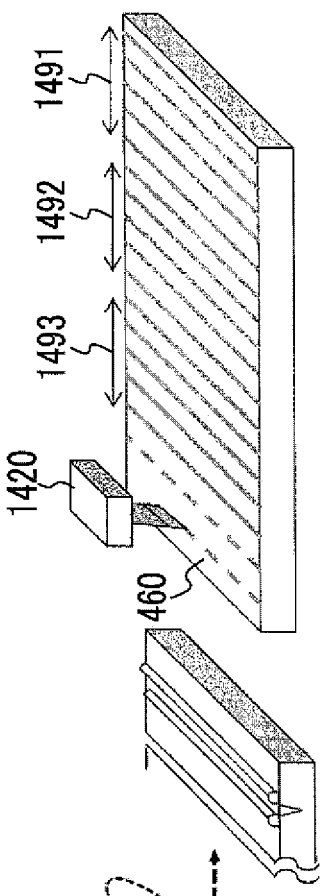
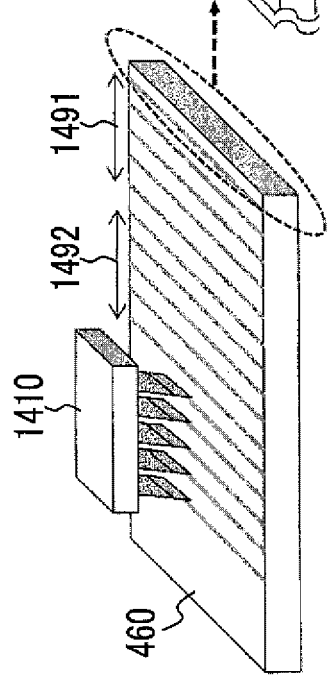
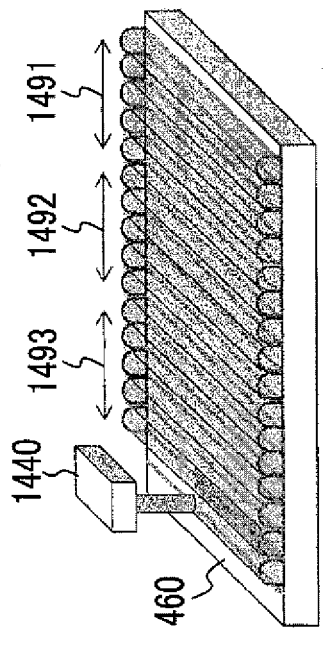
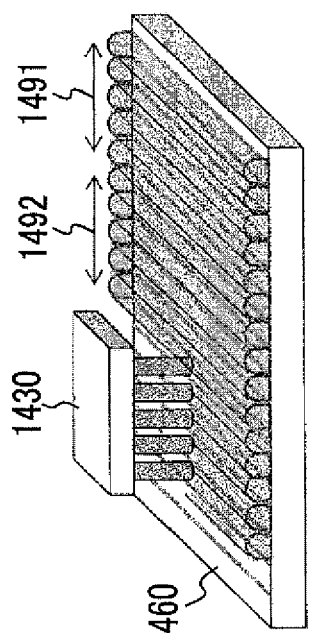

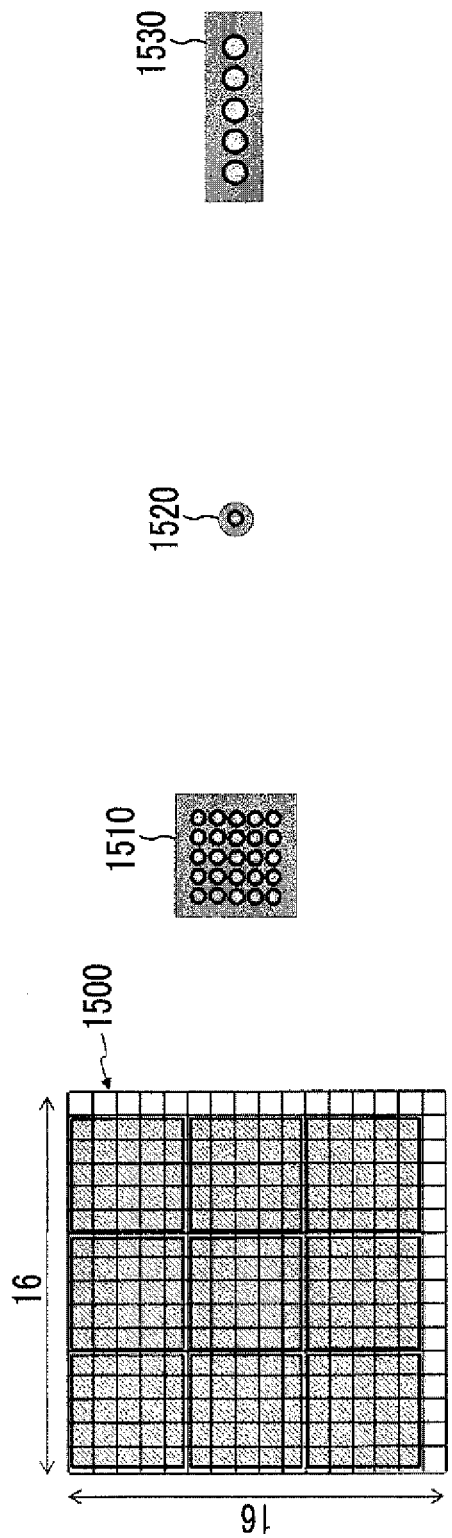

APPARATUS FOR MANUFACTURING LENS ARRAY AND METHOD OF MANUFACTURING LENS ARRAY

CROSS-REFERENCE TO RELATED APPLICATIONS

This application is based on and claims priority under 35 USC 119 from Japanese Patent Application No. 2013-110947 filed May 27, 2013.

BACKGROUND

Technical Field

The present invention relates to an apparatus for manufacturing a lens array and a method of manufacturing a lens array.

SUMMARY

According to an aspect of the invention, there is provided an apparatus for manufacturing a lens array including: a first lens forming unit that has a plurality of blades forming partition walls on a polymer substrate on which a parallax image is formed and a plurality of nozzles discharging a polymer; a detecting unit that detects a position of the parallax image; and a scanning control unit that adjusts a scanning start position of the first lens forming unit based on the position of the parallax image detected by the detecting unit and controls forming of the partition walls by the blades and discharging of the polymer to a region between the partition walls through the nozzle on a surface of the polymer substrate on which the parallax image is formed.

BRIEF DESCRIPTION OF THE DRAWINGS

Exemplary embodiments of the present invention will be described in detail based on the following figures, wherein:

FIG. 5 is a flow chart illustrating an example of the method of manufacturing a lens array on a printed material;

FIGS. 6A to 6C are explanatory views illustrating an example of partition walls and the like;

FIG. 10 is a flow chart illustrating an example of the method of manufacturing a lens array on a printed material, according to the first exemplary embodiment;

FIGS. 14A to 14E are explanatory views illustrating an example of the method of forming a lens array, according to the second exemplary embodiment; and FIGS. 15A to 15D are explanatory views illustrating another example of the method of forming a lens array, according to the second exemplary embodiment.

DETAILED DESCRIPTION

Hereinafter, examples in various types of suitable exemplary embodiments to realize the present invention will be described with reference to the drawings.

Figure 1:
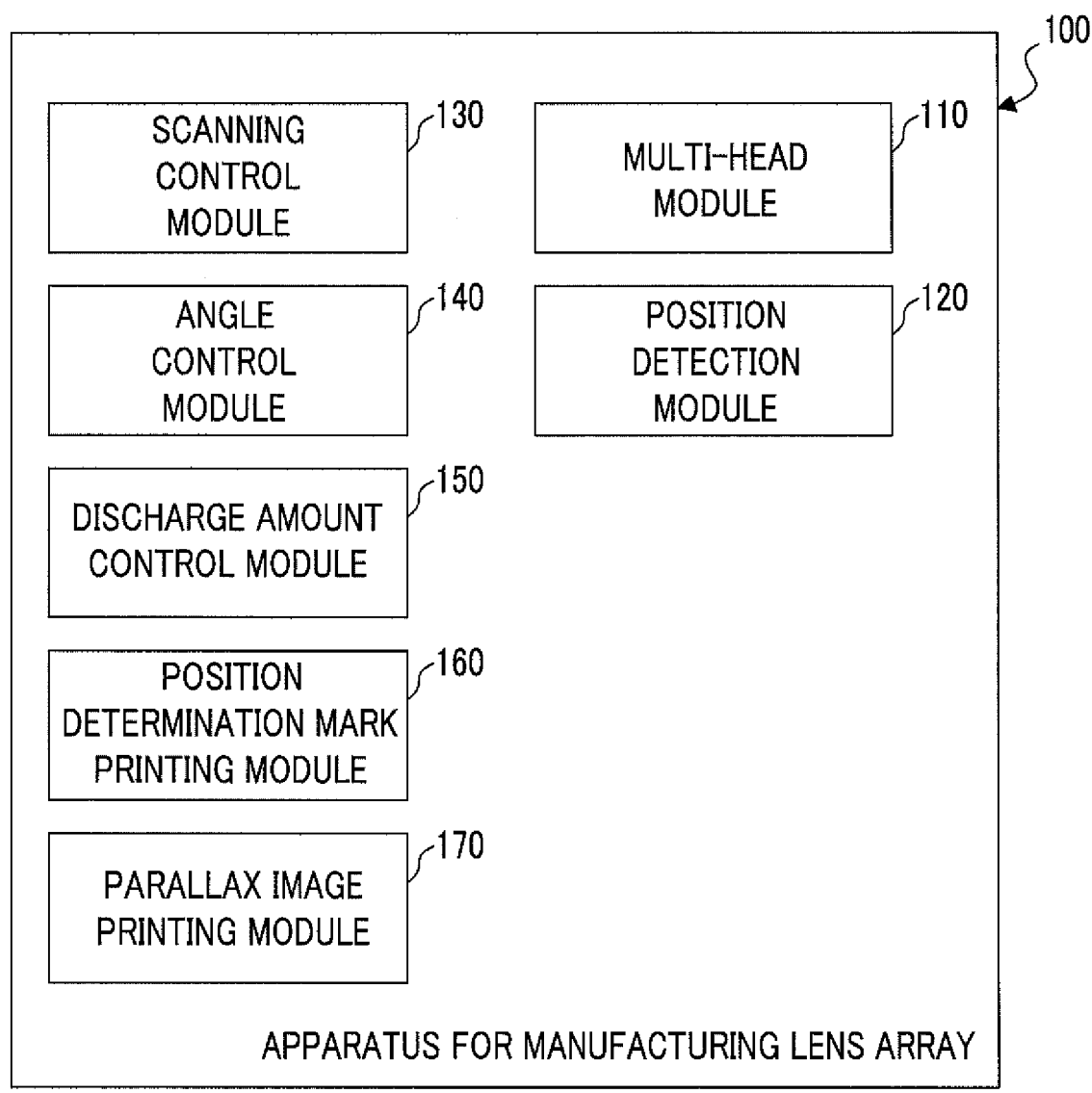
FIG. 1 is a conceptual configuration view of a module according to a configuration example of a first exemplary embodiment.

FIG. 1 illustrates a conceptual configuration view of a module according to a configuration example of a first exemplary embodiment.

The module according to the exemplary embodiment may include not only a module in a configuration of hardware but also a module that is controlled by a computer program. The term "predetermined" denotes that something is determined before an object processing and is used to include the meanings of being determined in accordance with current circumstances and states or in accordance with previous circumstances and states as long as the object processing is yet to be performed, even if the processing according to the exemplary embodiment is started, not to mention as long as the processing according to the exemplary embodiment is yet to be started. If there are plural "predetermined values", the values may be different from each other, and more than two values (naturally, including all the values) may be the same as each other. In addition, if there is a term describing "if something is A, B is performed", it is used in the meaning of "it is determined whether or not something is A, and if it is determined to be A, B is performed". However, this is not so when there is no need for determining whether or not something is A.

An apparatus for manufacturing a lens array in the exemplary embodiment is an apparatus that manufactures a lens array. As illustrated in the example of FIG. 1, an apparatus 100 for manufacturing a lens array has a multi-head (lens forming) module 110, a position detection module 120, a scanning control module 130, an angle control (angle adjusting) module 140, a discharge amount control module 150, a position determination mark printing module 160, and a parallax image printing module 170.

A lens array is configured in an optical system in which plural element lenses (lens elements), each of which forms an erect image, are arranged in parallel, and the erect images overlap to collectively form one continuous image. The lens array includes a lenticular lens. For example, it is possible to display (also referred to as "to perform changing of") plural images by exhibiting a three-dimensional image (also referred to as 3D) and changing a visual line. For an arrangement, there are one-dimensional arrangement (for example, a cylindrical lens array) as in the example of FIG. 14E described below and a second-dimensional arrangement (for example, a second-dimensional lens array such as a square lens array) as in the example of FIG. 15A.

The exemplary embodiment relates to a technique forming a lens array regarding an apparatus that outputs a printed material including a parallax image (also referred to as a stereoscopic image) on an original document. Particularly, regarding an apparatus that outputs an on-demand (case of manufacturing in small quantity or manufacturing on demand) printed material including the parallax image on a portion of an original document, the exemplary embodiment is suitable for a case of forming a lens array on only the parallax image. The aforementioned parallax image is an image that becomes an object of stereoscopic views or changing. In a parallax image employing the cylindrical lens, more than two images are cut into a strip shape and the cut images are alternately and sequentially arranged to make one image. In a parallax image employing the second-dimensional lens array, an image group to be changed in a longitudinal direction and an image group to be changed in a lateral direction are individually cut and the cut images are alternately and sequentially arranged in their own directions to make one image.

For this reason, there is a technique forming the partition walls on demand by cutting using a thin blade, discharging a liquid polymer thereto, and forming an element lens curvature portion. Then, in order to form the element lens at a high speed, a technique to perform scanning with a multi-head that includes plural blades for forming partition walls and plural nozzles discharging the liquid polymer is employed.

However, as the parallax image becomes larger, an alignment adjustment (position adjustment of parallax image and element lens) becomes more difficult.

In a technique employing a scanning-type multi-head, the exemplary embodiment performs alignment adjustment of the element lens formed on the parallax image.

A term "forming" includes the meaning of "printing", and hereinafter, printing will be described as an example thereof.

The multi-head module 110 includes the plural blades to form the partition walls with respect to the polymer substrate on which the parallax image is formed and the plural nozzles discharging the polymer, and forms the lens. In addition, at least one of the nozzles at an end portion of the multi-head module 110 may discharge the polymer being independent from other nozzles.

The position detection module 120 detects the position of the printed parallax image. For example, the position detection module 120 captures the parallax image, an alignment mark, or the like on the printing paper using a CCD camera and the like and detects a positional deviation deviated from an original position through pattern matching and the like.

The scanning control module 130 adjusts the scanning start position in accordance with the position of the parallax image detected by the position detection module 120, causes the multi-head module 110 to perform the scanning on the surface of the polymer substrate on which the parallax image is printed, forms the partition walls using the blades, and controls discharging of the polymer to a region between the partition walls through the nozzle.

The liquid polymer is suitable as the polymer. Each element lens is formed by surface tension of the liquid polymer. The lens shape is a convex shape. Here, the liquid polymer may be an ultraviolet (UV) curable polymer or may be a hot-melt polymer. The UV curable polymer is a synthetic polymer which chemically changes from a liquid to a solid in response to optical energy of ultraviolet rays. Hereinafter, the UV curable polymer is mainly exemplified and described. However, the hot-melt polymer does not need UV irradiation for curing while being cured by cooling.

The angle control module 140 adjusts angles of the multi-head module 110 with respect to a scanning direction in accordance with a gap between the parallax images detected by the position detection module 120.

The discharge amount control module 150 controls an amount of the polymer discharged by the nozzle of the multi-head module 110 based on a gap between the partition walls formed using the blades of the multi-head module 110.

The position determination mark printing module 160 prints the mark for position detecting which may be detected by the position detection module 120 corresponding to the position of the parallax image (for example, in the vicinity thereof).

The parallax image printing module 170 prints the parallax images on a printing paper. Then, the lens array is formed in a region where the parallax image is printed. The parallax images become plural images for the three-dimensional image or changing through the lens array.

FIGS. 2A to 2E are explanatory views illustrating an example of a method (principle of partition wall pinning method) of manufacturing a lens array by forming the partition walls. Here, to make the description simpler, the partition walls are formed using one blade 210, and the polymer is dripped through one polymer dripping device 240.

Figure 2A:
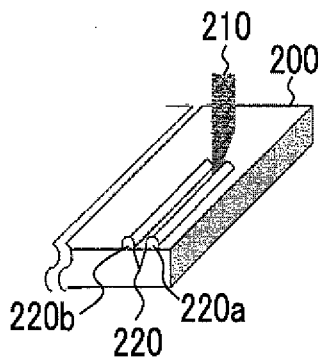
FIGS. 2A to 2E are explanatory views illustrating an example of a method of manufacturing a lens array by forming partition walls.
Figure 2B:
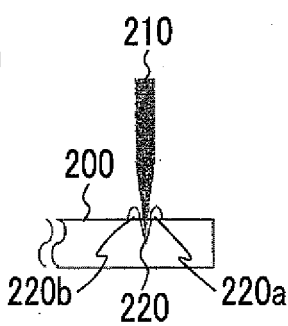

As exemplified in FIG. 2A, the scanning of cutting is performed using the blade 210 with respect to a groove 220 (cut forming of a groove 220 is made on a polymer substrate 200), and a partition wall 220a and a partition wall 220b are formed at both ends of the groove 220. The example of FIG. 2B illustrates a cross section when the blade 210 makes the cut on the polymer substrate 200.

Figure 2C:
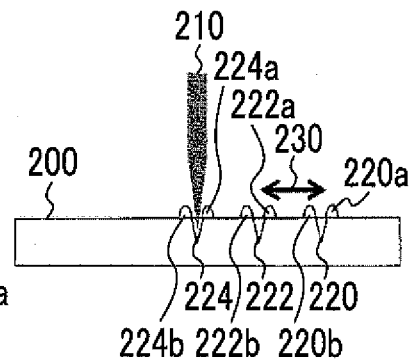

Next, as exemplified in FIG. 2C, the blade 210 is moved by a distance of a pitch 230, a cut is made (a groove 222, a groove 224), and partition walls 222a, 222b, 224a, 224b, and the like are formed. The pitch 230 is a distance between the partition walls and becomes a lens width. That is, the lens width is controlled by controlling the pitch 230.

Figure 2D:
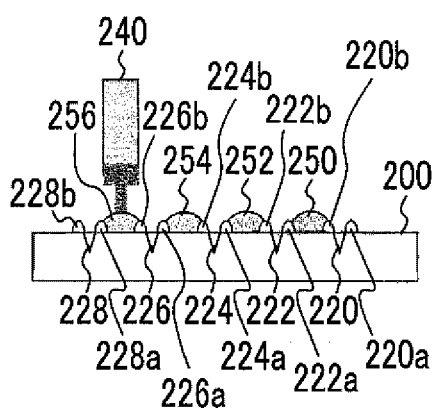

As exemplified in FIG. 2D, the UV curable polymer (a UV curable polymer 250 and the like) is discharged to the region between the partition walls (for example, between a partition wall 220b and a partition wall 222a) by the polymer dripping device 240. A curvature control is performed by the discharge amount.

Figure 3A:
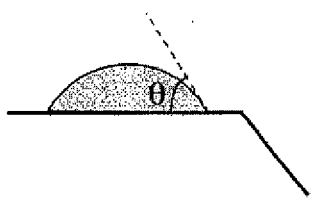
FIGS. 3A and 3B are explanatory views illustrating an example of a curvature control.
Figure 3B:
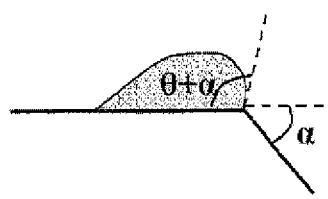

FIGS. 3A and 3B are explanatory views illustrating an example of the curvature control (pinning effect by a bent surface). As illustrated in the example of FIG. 3A, $\theta$ stands for a contact angle of a liquid interface of a liquid (the UV curable polymer 250 and the like) on a plate-shaped surface (the polymer substrate 200). As illustrated in the example of FIG. 3B, when there is a liquid on a plate-shaped edge (an angle $\alpha$ formed by a plane surface and an edge), the liquid may not be able to move until "contact angle>$\theta+\alpha$" is satisfied by a pitch control. Therefore, as a role of an apex portion of the partition wall of the polymer substrate 200, the contact angle forms an arbitrary angle from $\theta$ to $\theta+\alpha$, and it is possible to perform the curvature control by an amount of droplets (for example, see "J. F. Oliver et al, J. Colloids and interface Sci, 59, 568 (1977)").

Figure 2E:
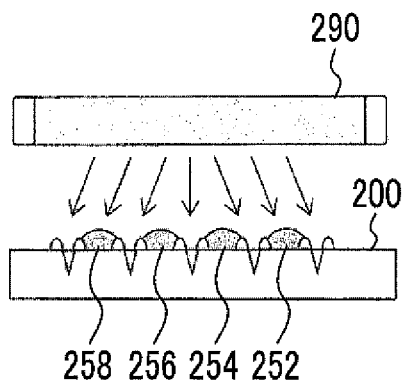

Next, as illustrated in the example of FIG. 2E, the UV curable polymer 250 and the like are cured by radiating UV light of a UV light source 290, thereby completing the lens array.

Figures 4A, 4B, 4C:
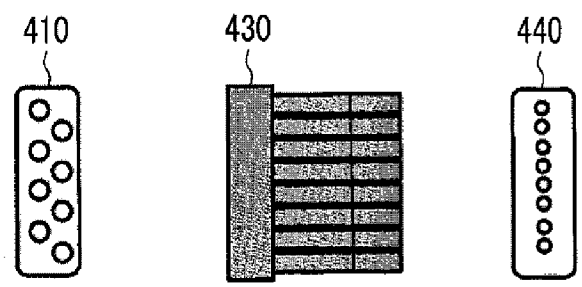
FIGS. 4A to 4D are explanatory views illustrating an example of the method of manufacturing a lens array on a printed material.
Figure 4D:
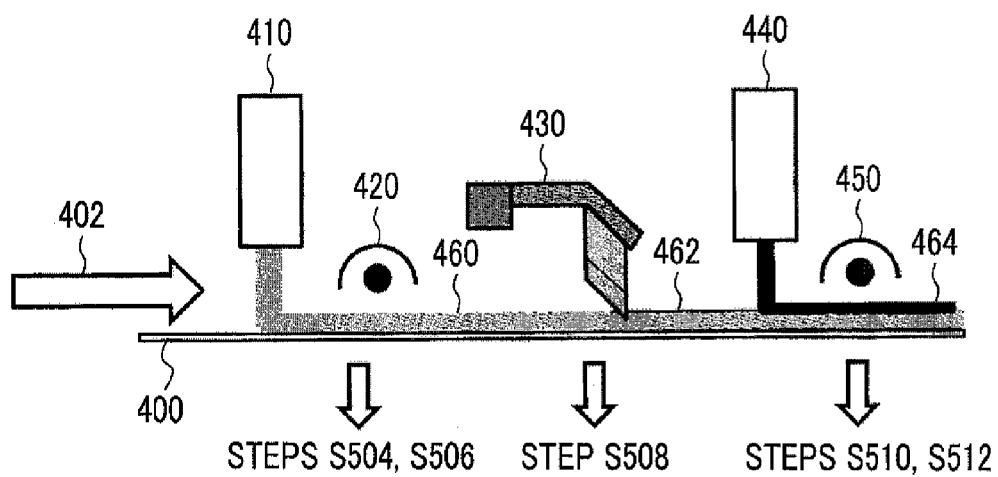

FIGS. 4A to 4D are explanatory views illustrating an example of the method of manufacturing a lens array on a printed material. That is, on a printing paper 400 where a plane image (2D image) and the parallax image are mixed, the lens array is formed in the region of the parallax image. The example of FIG. 4A illustrates a shape of a polymer dripping device 410 when the polymer dripping device 410 is viewed from a bottom thereof. The plural nozzles for applying the UV curable polymer are arranged. The example of FIG. 4B illustrates shapes of blades 430 when the blades 430 are viewed from a bottom thereof. The plural blades for forming the partition wall using the groove are arranged. The example of FIG. 4C illustrates a shape of a polymer dripping device 440 when the polymer dripping device 440 is viewed from a bottom thereof. The plural nozzles for discharging the UV curable polymer are arranged.

An example of a manufacturing method will be described using the devices exemplified in FIGS. 4A to 4D. FIG. 5 is a flow chart illustrating an example of the method of manufacturing a lens array on a printed material.

In step S502, the printing paper 400 is set. Here, the printing paper 400 moves in a paper feeding direction 402 (from the left to the right in the drawing).

In step S504, the UV curable polymer is applied to the necessary region of the printing paper 400 by the polymer dripping device 410. Accordingly, a polymer substrate 460 (pedestal) is formed on the printing paper 400. The UV curable polymer is applied to only the region of the parallax image. The UV curable polymer is controlled so as not to be applied to another region (a plane image). For example, coordinate information of the region of the parallax image (or a region other than the parallax image) is set in advance, and thus, applying of the UV curable polymer (dripping or not dripping) may be controlled by the polymer dripping device 410 according to the coordinate information.

In step S506, a UV light source 420 radiates UV light to cure the UV curable polymer.

In step S508, the blades 430 form partition walls 462 on the polymer substrate 460. As described before, the partition walls are formed by making grooves on the polymer substrate 460.

In step S510, the polymer dripping device 440 discharges the UV curable polymer to the region between the partition walls.

In step S512, a UV light source 450 radiates the UV light to cure the UV curable polymer (lens material).

Figure 6A:
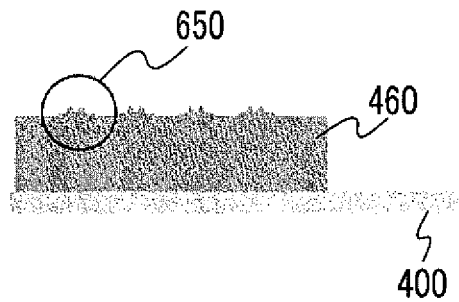
Figure 6B:
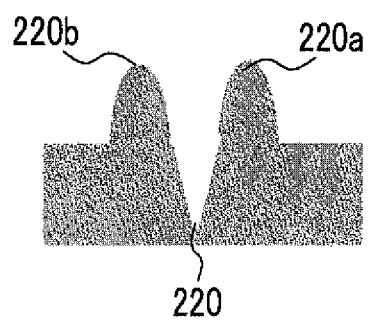
Figure 6C:
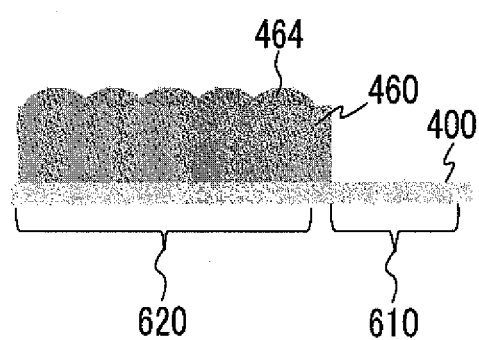

FIGS. 6A to 6C are explanatory views illustrating an example of the partition walls and the like of the lens array which is manufactured as in the examples of FIGS. 4A to 4D and 5. The example of FIG. 6A illustrates a cross-sectional view of the printing paper and the lens array. The example of FIG. 6B illustrates an enlarged view of a region 650. The example of FIG. 6C illustrates that the lens array is formed on a parallax image region 620 of the printing paper 400, but the lens array is not formed on a plane image region 610. For example, a thickness of the printing paper 400 is approximately 100 μm, a thickness of the polymer substrate 460 is approximately 300 μm, a thickness of a cylinder lens 464 is approximately 50 μm, and a width (width between the partition walls) of the cylinder lens 464 is approximately 250 μm.

Figure 7A:
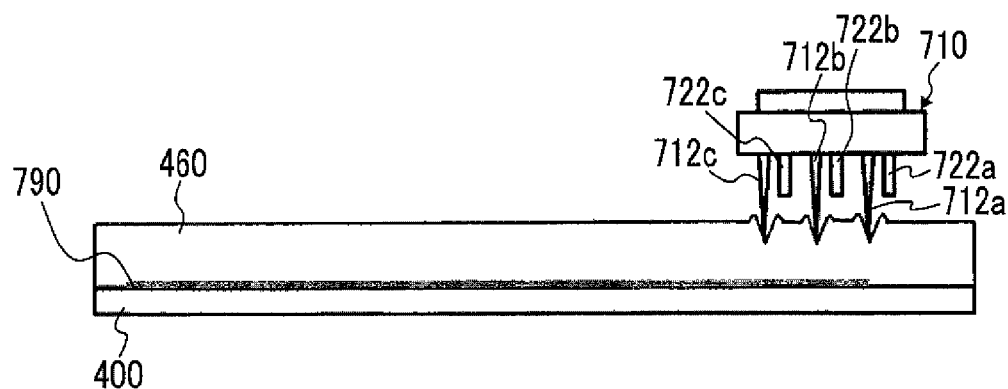
FIGS. 7A to 7C are explanatory views illustrating an example of forming of the lens array using a multi-head.
Figure 7B:
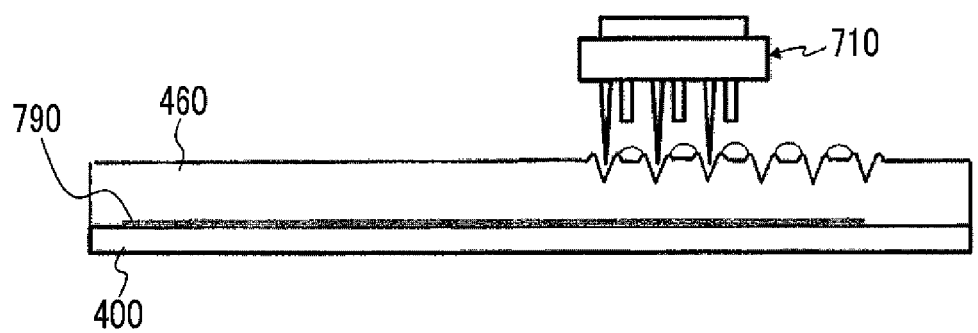
Figure 7C:
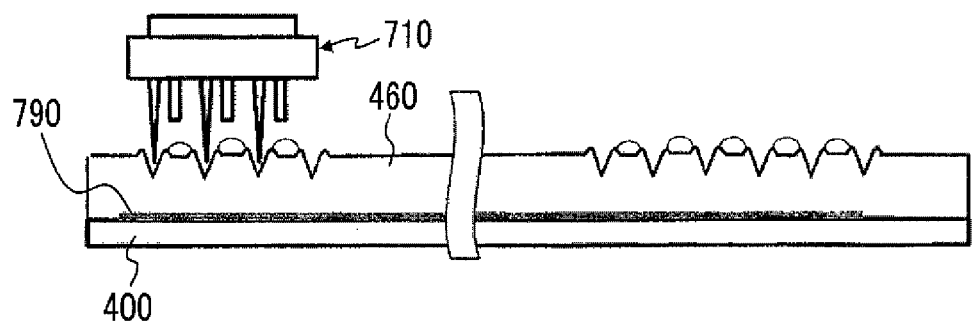

FIGS. 7A to 7C are explanatory views illustrating an example of forming of the lens array using a multi-head. However, the position detection module 120 is not included. That is, a multi-head 710 simply includes plural blades (blades 712a, 712b, 712c) for forming the partition walls and nozzles (nozzles 722a, 722b, 722c) which discharge the polymer. To be more specific, the two nozzles are provided between the blades for forming the partition walls, and one nozzle is provided at an end (at a right end in FIGS. 7A to 7C, but at a left end when a sub-scanning direction of the multi-head 710 is a direction from the left to the right). Accordingly, as illustrated in the example of FIGS. 7A to 7C, the plural grooves (partition walls) are formed and the UV curable polymer is dripped. Naturally, the multi-head 710 may be moved, and the printing paper 400 may be transported.

Here, positions of a parallax image 790 and the lens need to coincide with each other. However, there is a possibility that an error may occur in printing magnification of the parallax image. Since the error may not be able to be managed in the multi-head 710 exemplified in FIGS. 7A to 7C, if the parallax image becomes large (as illustrated in the example of FIG. 7C, if there are multiple movements of the multi-head 710), a positional error between the lens and the parallax image at an end portion of the parallax image becomes large, thereby easily causing crosstalk.

Figure 8A:
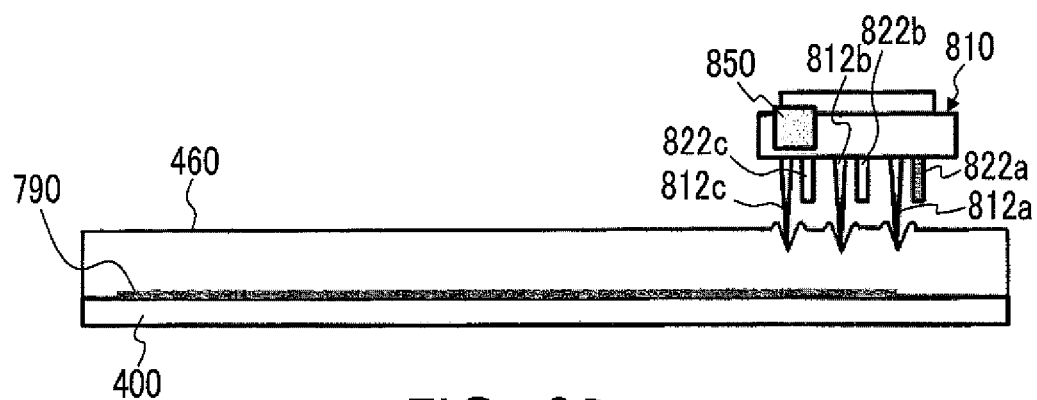
FIGS. 8A to 8C are explanatory views illustrating another example of the forming of the lens array using the multi-head according to the first exemplary embodiment.
Figure 8B:
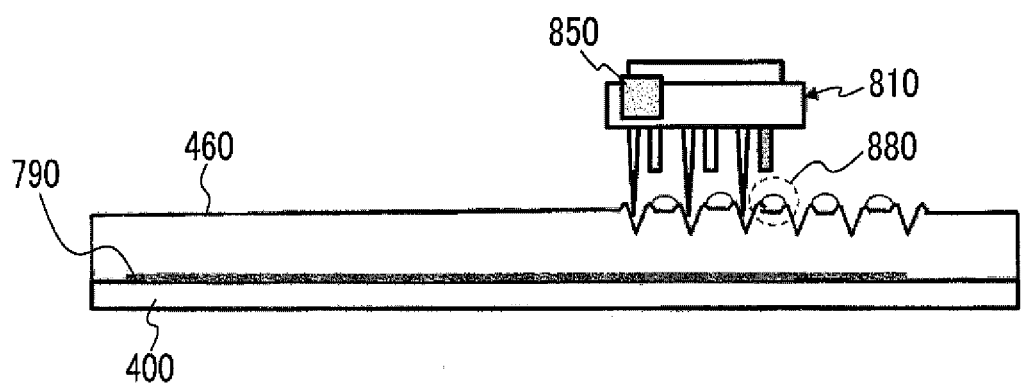
Figure 8C:
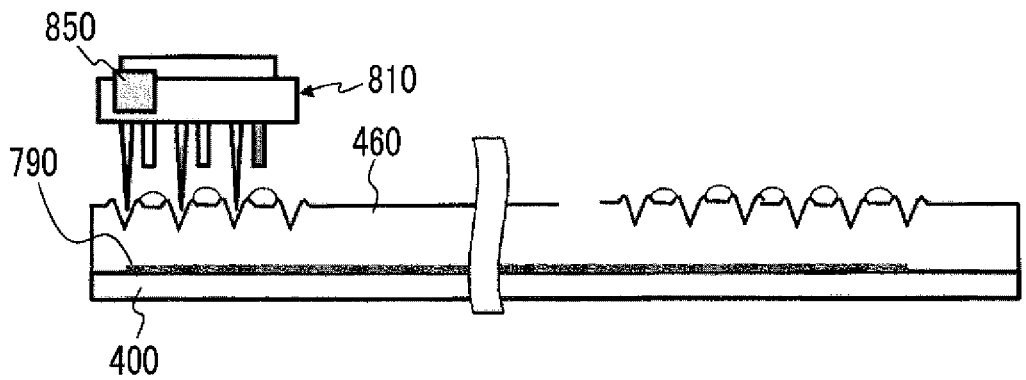

FIGS. 8A to 8C are explanatory views illustrating another example of the forming of the lens array using the multi-head according to the first exemplary embodiment. In this example, a parallax image position detection mechanism 850 (the position detection module 120) is added to the multi-head 710 illustrated in the example of FIGS. 7A to 7C to be controlled by the scanning control module 130 through the detection thereof. Specifically, a position of the parallax image is detected by the parallax image position detection mechanism 850, and a shift amount (scanning start position) of a multi-head 810 is adjusted in accordance with the position of the parallax image thereof (a position to be cut by blades on the parallax image is specified), thereby correcting an alignment. If there is no need for an adjustment, a start position may be moved by an effective width of the multi-head 810. Accordingly, the positional error between the parallax image and the element lens is reduced, the crosstalk is reduced, and image quality of a stereoscopic image and the like are improved. A nozzle 822a of the multi-head 810 is able to be independently controlled with respect to other nozzles (a nozzle 822b, a nozzle 822c). Here, the term "able to be independently controlled" includes controlling of whether or not the polymer is dripped. The term includes that the nozzle 822a is controlled not to perform the dripping of the polymer at the first scanning (that is, in the state of FIG. 8A), because there is only one partition wall on a side at the first scanning, and it is not suitable to drip the polymer.

Furthermore, as being able to be independently controlled, the discharge amount control module 150 may control the discharge amount of the polymer corresponding to a change of the width of the partition walls by the adjusted shift amount to uniformly maintain the curvature. That is, since the shift amount (scanning start position) of the multi-head 810 is adjusted, the size of the element lens which is formed by the polymer dripped by the nozzle 822a differs. Because even if the adjustment is performed, there is no change in the distances between the partition walls formed by a blade 812a and a blade 812b, and the blade 812b and a blade 812c, but the distance between the partition walls generated during the movement (a movement in the sub-scanning direction, that is, a movement from the first scanning illustrated in the example of FIG. 8A to a second scanning illustrated in the example of FIG. 8B) of the multi-head 810 differs from the distances between other partition walls. For example, when the distance between the partition walls becomes greater than the distance between other partition walls, the discharge amount of the polymer is increased, and when the distance between the partition walls becomes less than the distance between other partition walls, the discharge amount of the polymer is reduced, thereby discharging the amount to uniformly maintain the curvature of each element lens. At a correction point 880 illustrated in FIG. 8B, the gap is caused to be narrower than other gaps so as to be reduced in the discharge amount of the polymer. In addition, as illustrated in the example of FIG. 8C, even if there are multiple movements of the multi-head 810, the alignment error between the element lens and the parallax image is not large compared to the example of FIG. 7C.

For example, the parallax image position detection mechanism 850 may be caused to detect the parallax image and detect the error by the pattern matching with predetermined image information (original parallax image information). In addition, the parallax image position detection mechanism 850 may be caused to detect an alignment mark (a register mark, a mark for detecting a position) which is printed by the position determination mark printing module 160. The multi-head 810 may be moved so as to match the position of the register mark. In addition, the position determination mark printing module 160 may print the alignment mark using a printing material (for example, toner and the like which are substantially transparent in a visible region while being detectable by infrared rays) which is difficult to be sensed by the human visual sense. For example, plural alignment marks corresponding to the effective width of the multi-head 810 may be printed simultaneously with the parallax image in the vicinity of the parallax image.

Figure 9:
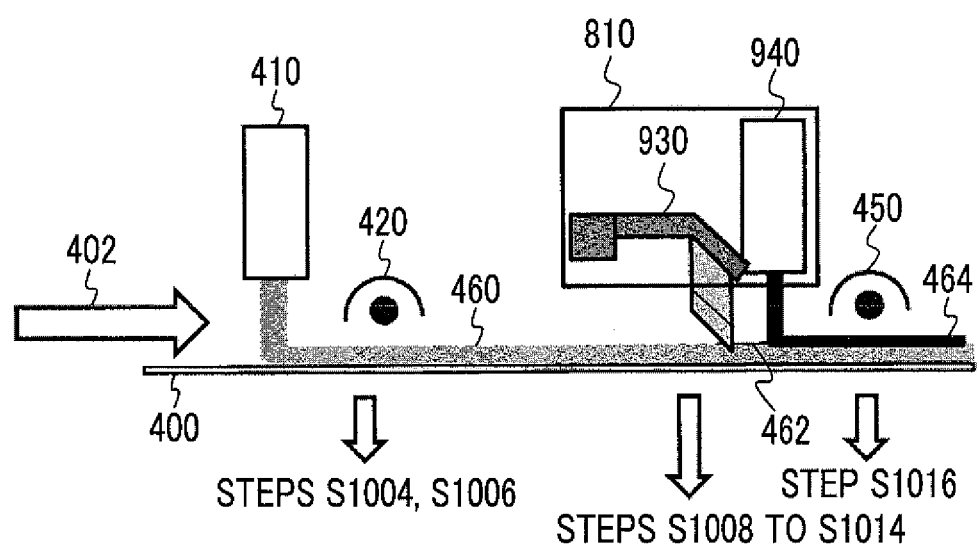
FIG. 9 is an explanatory view illustrating an example of the method of manufacturing a lens array on a printed material, according to the first exemplary embodiment.

FIG. 9 is an explanatory view illustrating an example of the method of manufacturing a lens array on a printed material, according to the first exemplary embodiment. This example is different from the manufacturing method illustrated in FIGS. 4A to 4D in that the multi-head 810 is used.

FIG. 10 is a flow chart illustrating an example of the method of manufacturing a lens array on a printed material, according to the first exemplary embodiment.

In step S1002, the printing paper 400 is set. Here, the printing paper 400 moves in the paper feeding direction 402 (from the left to the right in the drawing).

In step S1004, the UV curable polymer is applied in the necessary region of the printing paper 400 by the polymer dripping device 410. Accordingly, the polymer substrate 460 (pedestal) is formed on the printing paper 400. The UV curable polymer is applied to only the region of the parallax image. The UV curable polymer is controlled so as not to be applied to another region (a plane image). For example, the coordinate information of the region of the parallax (or a region other than the parallax image) is set in advance, and thus, applying (dripping or not dripping) of the UV curable polymer may be controlled by the polymer dripping device 410 according to the coordinate information.

In step S1006, the UV light source 420 radiates the UV light to cure the UV curable polymer.

In step S1008, the parallax image position detection mechanism 850 detects the alignment mark.

In step S1010, the scanning control module 130 determines whether or not the position is the original position, and when it is the original position, the process proceeds to step S1014. In other cases, the process proceeds to step S1012.

In step S1012, the scanning control module 130 adjusts the scanning start position of the multi-head 810.

In step S1014, while blades 930 inside the multi-head 810 form the partition walls on the polymer substrate 460, a polymer dripping device 940 discharges the UV curable polymer to the region between the partition walls.

In step S1016, the UV light source 450 radiates the UV light to cure the UV curable polymer (lens material).

Processing details of the angle control module 140 will be described with reference to FIGS. 11A and 11B and FIGS. 12A and 12B.

Figure 11A:
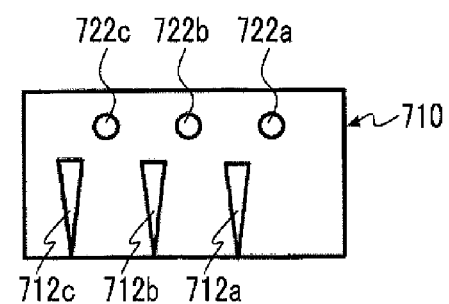
FIGS. 11A and 11B are explanatory views illustrating an example of the method of manufacturing a lens array on a printed material.
Figure 11B:
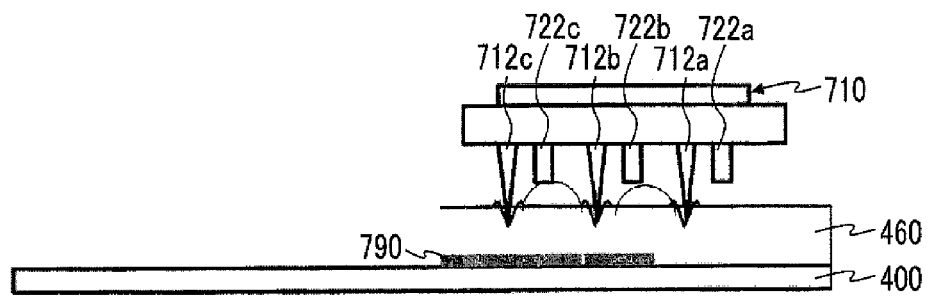

FIGS. 11A and 11B are explanatory views illustrating an example of the method of manufacturing a lens array on a printed material.

The example of FIG. 11A illustrates a shape of the multi-head 710 when viewed from the bottom. That is, there are disposed plural blades (blades 712*a*, 712*b*, 712*c*) and plural nozzles (nozzles 722*a*, 722*b*, 722*c*). As illustrated in the example of FIG. 11B, the crosstalk occurs when plural lens pitches which are formed at the same time by the multi-head 710 are different from a pitch of the parallax image 790.

Figure 12A:
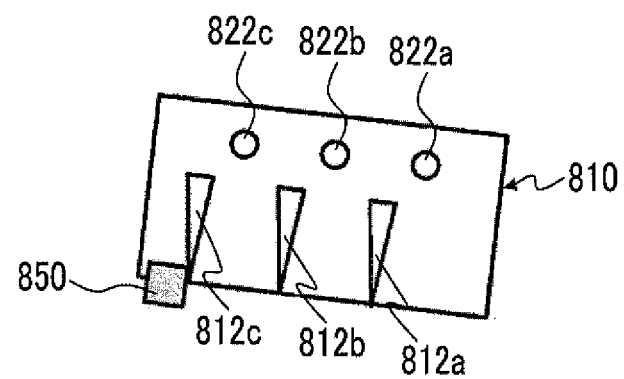
FIGS. 12A and 12B are explanatory views illustrating an example of the method of manufacturing a lens array (adjusting gap between partition walls) on a printed material, according to the first exemplary embodiment.
Figure 12B:
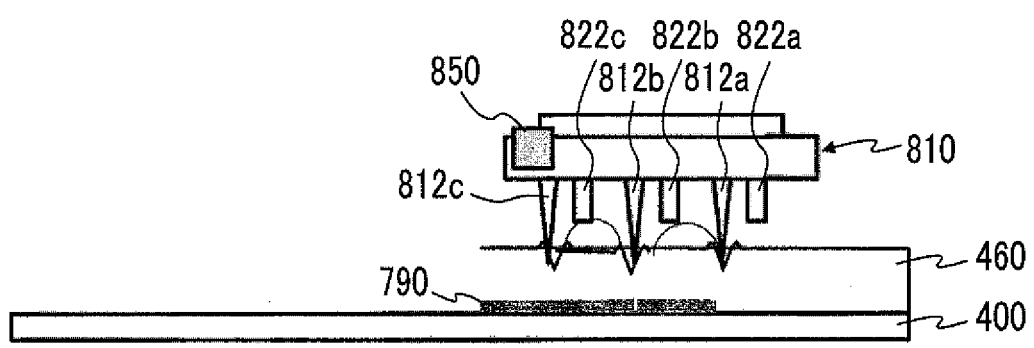

FIGS. 12A and 12B are explanatory views illustrating an example of the method of manufacturing a lens array (adjusting a gap between partition walls) on a printed material, according to the first exemplary embodiment.

The example of FIG. 12A illustrates a shape of the multi-head 810 when viewed from the bottom. That is, there are disposed plural blades (blades 812*a*, 812*b*, 812*c*) and plural nozzles (nozzles 822*a*, 822*b*, 822*c*), and the parallax image position detection mechanism 850 is disposed at a position where the alignment mark may be detected. Then, the example illustrates a state where the multi-head 810 is tilted by the angle control module 140. The multi-head 810 adjusts the angle in order to match the width between the partition walls (a width of the element lens) to the gap of the parallax image.

As illustrated in the example of FIG. 12B, when an error is detected by the position detection module 120, that is, when the plural lens pitches which are formed at the same time by the multi-head 810 are slightly different from the pitch of the parallax image, a pitch of the blades is adjusted by tilting the multi-head 810 itself. In accordance therewith, the discharge amount control module 150 changes the discharge amount of the polymer, thereby uniformly maintaining the curvature. Naturally, when the scanning control module 130 further adjusts the scanning start position, the discharge amount control module 150 calculates the discharge amount of the polymer of the nozzle 822*a* based on the distance between the partition walls and the scanning start position according to the tilt angle, thereby adjusting the discharge amount independently of other nozzles.

Figure 13:
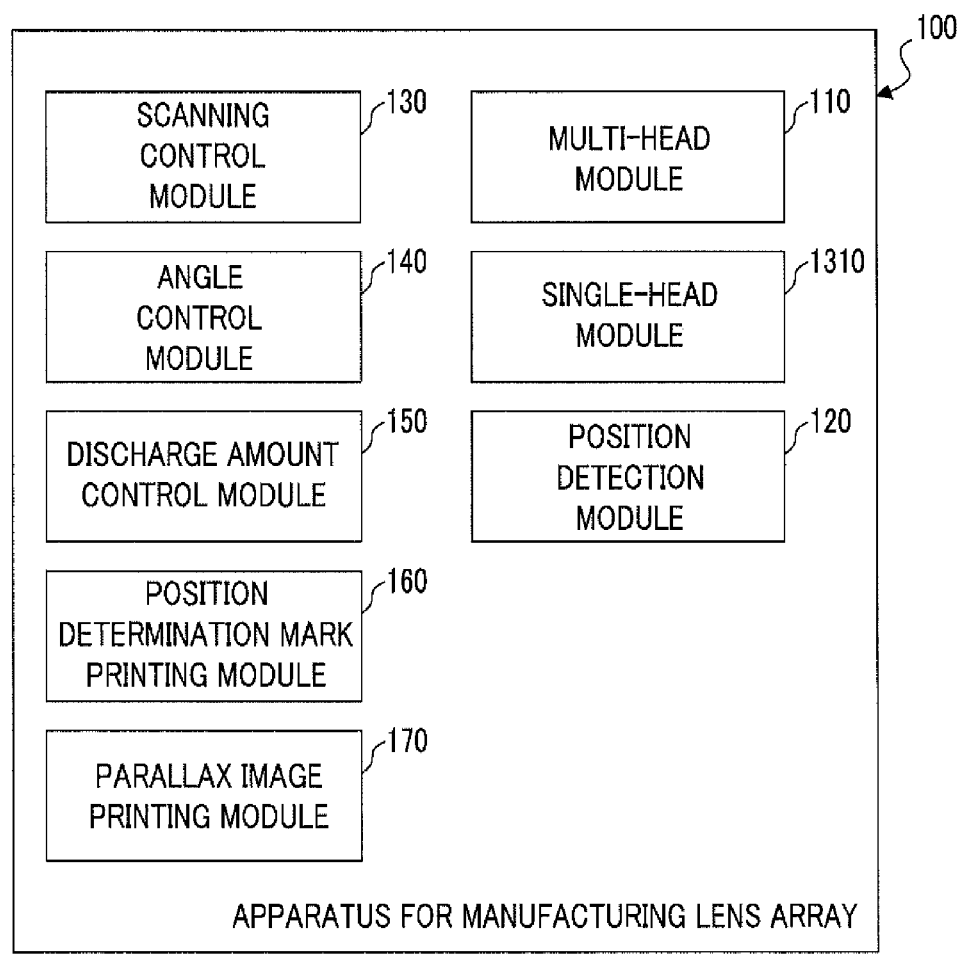
FIG. 13 is a conceptual configuration view of the module according to a configuration example of a second exemplary embodiment.

FIG. 13 is a conceptual configuration view of the module according to a configuration example of a second exemplary embodiment. The second exemplary embodiment is made by adding a single-head module 1310 to the first exemplary embodiment. The same reference numerals are applied to the portion of the same type as the first exemplary embodiment, and overlapping descriptions will not be repeated.

The apparatus 100 for manufacturing a lens array according to the second exemplary embodiment has the multi-head module 110, the position detection module 120, the scanning control module 130, the angle control module 140, the discharge amount control module 150, the position determination mark printing module 160, the parallax image printing module 170, and the single-head module 1310.

The single-head module 1310 includes one set of the blade for forming the partition walls and the nozzle discharging the polymer.

The scanning control module 130 determines the number of scans of the multi-head module 110 based on the number of the grooves (A) to be formed, and sets the additional number of the grooves with respect to the number of the grooves (A) to be formed as the number of the scans of the single-head module 1310 regarding the number of the scans of the multi-head module 110. The number of the scans of the multi-head module 110 is determined so that the number of the grooves (B) to be formed by the number of the scans becomes less than the number of the necessary grooves (A). The additional number of the grooves is (A)−(B). Moreover, (B) is (the number of scans)×(the number of blades of the multi-head module 110).

In addition, the second exemplary embodiment does not need to have the single-head module 1310. That is, all the cases of the numbers of the grooves are managed simply by the multi-head module 110. The scanning control module 130 may determine the number of the scans of the multi-head module 110 based on the number of the grooves (A) to be formed, and may cause the blade to perform the scanning of the formed grooves as many as the number of extra grooves with respect to the number of the grooves (A) to be formed regarding the number of the scans of the multi-head module 110. Here, the number of the scans of the multi-head module 110 is determined so that the number of the formed grooves (C) by the number of the scans becomes more than the number of the necessary grooves (A). That is, the number of extra grooves is (C)−(A). The blades are caused to perform the scanning of the formed grooves as many as the number of the extra grooves ((the number of scans)×(the number of blades of the multi-head module 110)−(A)). Naturally, the value of (A)−(the number of scans−1)×(the number of blades of the multi-head module 110) is the number of the grooves to be newly formed by a part of blades when the other part of blades perform the scanning of the formed grooves. The scanning of the formed grooves by the blades may be not only the last scanning but also the second scanning and thereafter.

The partition wall pinning method as a method of manufacturing a lens array forms the partition walls by scratching the polymer substrate with sharp blades and suppresses a flow of the liquid polymer which is a fluidity polymer by the pinning effect of the partition walls. Therefore, the partition walls are formed at the necessary lens pitch, thereby forming the lens by discharging the liquid polymer to the region between the partition walls. The curvature of the lens (a focal length) is controlled by the volume of the discharging liquid polymer. This method of manufacturing a lens array has an advantage in which a lens size may be flexible when one blade scratches the polymer substrate and one nozzle discharges the liquid polymer.

However, if there are only one blade and one nozzle, manufacturing time is prolonged, and thus, the multi-head module is used as the method to shorten the manufacturing time.

However, in the method using the multi-head module, flexibility in changing the lens size (the number of element lenses) is lowered. That is, the lens size is limited to integer multiple of "the number of nozzles×pitch".

In the second exemplary embodiment, both the multi-head and the single-head are used. Otherwise, only the multi-head is used.

An example of a cylindrical lens array will be described.
(A) The partition wall (groove) is formed.
(A1) When the pitch of the cylindrical lens array to be manufactured is p, and the total number of lenses is n, the overall width of the lens becomes np.
(A2) The number of necessary grooves in order to manufacture n cylindrical lenses is (n+1).
(A3) In addition, the total number of the blades of a multi-blade (pitch=p) is b.
(A4) At this time, if the maximum integer equal to or less than a ratio to the total number of the grooves (n+1)/b is $N_b$, $N_b$ times of the scanning is performed by the multi-head module 110, and the remaining {(n+1)−$N_b$b} grooves are formed by the single-head module 1310.

(B) Forming of the cylindrical lens array
(B1) Similar to the above description, when the pitch of the cylindrical lens array to be manufactured is p, and the total number of lenses is n, the overall width of the lens becomes np.
(B2) In addition, the total number of the nozzles of the multi-nozzle (pitch=p) is m.
(B3) At this time, if the maximum integer equal to or less than a ratio to the total number of the lenses (n/m) is $N_n$, $N_n$ times of the scanning is performed by the multi-head module 110, and the remaining (n−$N_n$m) cylindrical lenses are formed by the single-head module 1310.

The multi-head module 110 and the single-head module 1310 may have the blades and the nozzles in an integrated type or a separated type.

In addition, in this description, the term "the number of grooves" (the number of scratches by blades) is stated instead of the term "the number of partition walls". Since the partition walls are formed at both sides of the grooves, the number of the partition walls is twice the number of the grooves. Therefore, the number of the grooves denotes the number of pairs of partition walls.

FIGS. 14A to 14E are explanatory views illustrating an example of the method of forming a lens array (cylindrical lens), according to the second exemplary embodiment.

The example illustrates the manufacturing of sixteen cylindrical lenses by a multi-head (blades) 1410 (five-blade array), a multi-head (nozzles) 1430 (five-nozzle array), a single-head (blade) 1420 (single-blade), and a single-head (nozzle) 1440 (single-nozzle).

(1) As illustrated in the example of FIGS. 14A and 14C, the scanning is performed on the polymer substrate 460 three times for the multi-head (blades) 1410 and twice for the single-head (blade) 1420. In this manner, seventeen partition walls are formed in total. The example of the FIG. 14A illustrates one groove and partition walls formed by one blade. Each of batches 1491 and 1492 may be formed by one scanning of the multi-head (blades) 1410.

(2) Thereafter, as illustrated in FIGS. 14D and 14E, the scanning is performed three times for the multi-head (nozzles) 1430 and once for the single-head (nozzle) 1440. In this manner, sixteen cylindrical lenses are formed in total.

When using the multi-head which has a set of five blades and five nozzles and the single-head which has a set of one blade and one nozzle, while processing the procedure (1), the processing of the procedure (2) is performed.

In addition, in the procedure (2), if the cut is made again at the same place (grooves for two lines) by the multi-head module 110, the single-head is not necessary. That is, three grooves are newly formed by the multi-head (blades) 1410. However, when the multi-head module has the blades and the nozzles which are integrated with each other, the nozzle corresponding to the same place is controlled so as not to discharge the polymer.

An example of a square-shaped lens array will be described.
(A) The partition wall (groove) is formed.
(A1) When the pitch of the square-shaped lens array to be manufactured is p (line) and q (row), and the number of the lines and the number of the rows are respectively $n_p$ and $n_q$, the total number of the lenses becomes n=($n_p$× $n_q$).

(A2) In addition, the lens size becomes ($n_p$p×$n_q$q). To be considered similar to the description in the cylindrical lens, the numbers of grooves formed in a line direction and a row direction are respectively ($n_p$+1) and ($n_q$+1).

(A3) In addition, the total number of the blades of the multi-blade (pitch=p (line) or q (row)) is b. To be brief, the total number of the blades in the line direction and the row direction is the same b. At this time, if the maximum integer equal to or less than a ratio to the total number of the grooves in the line direction ($n_p$+1)/b is $N_{bp}$, $N_{bp}$ times of the scanning is performed by the multi-blade, and the remaining {($n_p$+1)−$N_{bp}$b} grooves are formed by the single-blade.

(A4) Similarly, if the maximum integer equal to or less than a ratio to the total number of the grooves in the row direction ($n_q$+1)/b is $N_{bq}$, $N_{bq}$ times of the scanning is performed by the multi-blade, and the remaining {($n_q$+1)−$N_{bq}$b} grooves are formed by the single-blade.

(B) Forming of the square-shaped lens array (B1) Similar to the above description, when the pitches of the squared-shaped lens array to be manufactured are p (line) and q (row), and the number of the lines and the number of the rows are respectively $n_p$ and $n_q$, the total number of the lenses becomes n=($n_p$×$n_q$).

(B2) In addition, the lens size becomes ($n_p$p×$n_q$q).

(B3) In addition, the total number of the nozzles of the multi-nozzle (pitch=p (line) or q (row)) is ($m_p$ (line)× $m_q$ (row)).

(B4) At this time, if the maximum integer equal to or less than a ratio of the total number of the lenses to the total number of the nozzles in the line direction ($n_p$/$m_p$) is $N_{np}$, and if the maximum integer equal to or less than the ratio of the total number of the lenses to the total number of the nozzles in the row direction ($n_q$/$m_q$) is $N_{nq}$, the multi-nozzle is moved to ($N_{np}$×$N_{nq}$) blocks, thereby forming the lens.

(B5) The number of lenses manufactured at this time is ($m_p N_{np}$×$m_q N_{nq}$).

(B6) The remaining {n−($m_p N_{np}$×$m_q N_{nq}$)}={($n_p$×$n_q$)−($m_p N_{np}$×$m_q N_{nq}$)} lenses are formed by the single-head.

FIGS. 15A to 15D are explanatory views illustrating another example of the method of forming a lens array (square-shaped lens array), according to the second exemplary embodiment.

In the example, square-shaped lens arrays in the numbers of 16 by 16 are manufactured by the multi-head module 110 of a 5-by-5 array and the single-head module 1310. The example illustrates the manufacturing by a five-blade array, a five-nozzle array (5-by-5 nozzle array 1510), the single blade, and a single nozzle (a single nozzle 1520).

(1) Seventeen grooves are formed in the longitudinal direction and the lateral direction. As the forming method, similarly to the case of the cylindrical lens illustrated in the example of FIGS. 14A to 14E, the five-blade array (the multi-head module 110) and the single blade array (the single-head module 1310) are caused to perform the scanning in the longitudinal and the lateral directions, thereby forming the grooves. In this manner, as illustrated in the example of FIG. 15A, a square-shaped opening array (the shaded portion within a square-shaped opening array 1500) of 16 by 16 is formed.

(2) The lenses are formed in nine blocks (the shaded portions within the square-shaped opening array 1500) by the 5-by-5 nozzle array (the multi-head module 110, the 5-by-5 nozzle array 1510 illustrated in FIG. 15B).

(3) The lenses are formed in the remaining 31 openings by the single nozzle (the single-head module 1310, a single nozzle 1520 exemplified in FIG. 15C).

When using the multi-head module which has a set of five blades and five nozzles and the single-head module which has a set of one blade and one nozzle, while processing the procedure (1), the processing of the procedure (2) is performed. However, the aforementioned one blade (each of blades within the multi-head module, a blade within the single-head module) is not a blade to form a straight-lined groove as illustrated in FIGS. 14A to 14E and the like, but a square-shaped blade. The head module is pressed against the polymer substrate, and thus it is possible to form the groove (partition wall) configuring the square-shaped opening.

In addition, in the procedure (2), if the cut is made again at the same place (grooves for opening of 5 by 4 or 4 by 4) by the multi-head module 110, the single head is not necessary. That is, the groove for the opening of (4 by 1) is newly formed by the multi-head module. However, when the multi-head module has the blades and the nozzles which are integrated with each other, the nozzle corresponding to the same place is controlled so as not to discharge the polymer.

In addition, instead of the 5-by-5 nozzle array 1510, a 5-by-1 nozzle array 1530 exemplified in FIG. 15D may be used. In this case, the 5-by-1 nozzle array 1530 may be caused to perform the scanning for five lines.

The example is described with reference to the square-shaped lens. However, the shape may be a quadrangle shape such as a rectangle shape, a regular polygonal shape such as a regular hexagonal shape, a circularity shape, and an elliptical shape.

The above described exemplary embodiments are a portion of the exemplary embodiments of the invention. However, without being limited thereto, various modifications and changes may be made without departing from the scope and spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus used for manufacturing a lens array comprising:
   a first lens forming unit that has (i) a plurality of blades that form a plurality of partition walls on a polymer substrate on which a parallax image is formed, and (ii) a plurality of nozzles discharging a polymer;
   a detecting unit that detects a position of the parallax image; and
   a scanning control unit that (i) controls forming of the partition walls by the blades, including scanning the first lens forming unit in a first scan to form first partition walls, and scanning the first lens forming unit in a second scan that is next to the first scan to form second partition walls, (ii) adjusts a distance between the first partition walls and the second partition walls based on the position of the parallax image detected by the detecting unit, and (iii) controls discharging of the polymer through the nozzle to a region between the first partition walls and the second partition walls on a surface of the polymer substrate on which the parallax image is formed.

2. The apparatus used for manufacturing a lens array according to claim 1, further comprising:
an angle adjusting unit that adjusts an angle of the first lens forming unit with respect to a scanning direction based on information of the parallax image detected by the detecting unit.

3. The apparatus used for manufacturing a lens array according to claim 1, further comprising:
a discharge amount control unit that controls an amount of the polymer discharged through the nozzles based on the distance between the first partition walls and the second partition walls.

4. The apparatus used for manufacturing a lens array according to claim 2, further comprising:
a discharge amount control unit that controls an amount of the polymer discharged through the nozzles so that the discharge amount is increased if the distance between the first partition walls and the second partition walls is greater than a distance between other partition walls that are adjacent to each other.

5. The apparatus used for manufacturing a lens array according to claim 1, wherein at least one nozzle at an end portion of the first lens forming unit discharges the polymer independently of other nozzles.

6. The apparatus used for manufacturing a lens array according to claim 3, wherein at least one nozzle at an end portion of the first lens forming unit discharges the polymer independently of other nozzles.

7. The apparatus used for manufacturing a lens array according to claim 1, further comprising:
a printing unit that prints a mark for position detecting which can be detected by the detecting unit,
wherein the detecting unit detects the mark for position detecting which is printed by the printing unit to detect the position of the parallax image.

8. The apparatus used for manufacturing a lens array according to claim 2, further comprising:
a printing unit that prints a mark for position detecting which can be detected by the detecting unit,
wherein the detecting unit detects the mark for position detecting which is printed by the printing unit to detect the position of the parallax image.

9. The apparatus used for manufacturing a lens array according to claim 1, wherein the scanning control unit determines the number of scans of the first lens forming unit based on the number of grooves to be formed and performs the scanning while causing the blades to perform the scanning of the formed grooves based on the number of the extra grooves with respect to the number of the grooves to be formed in the number of the scans of the first lens forming unit.

10. The apparatus used for manufacturing a lens array according to claim 2, wherein the scanning control unit determines the number of scans of the first lens forming unit based on the number of grooves to be formed and performs the scanning while causing the blades to perform the scanning of the formed grooves based on the number of the extra grooves with respect to the number of the grooves to be formed in the number of the scans of the first lens forming unit.

11. The apparatus used for manufacturing a lens array according to claim 3, wherein the scanning control unit determines the number of scans of the first lens forming unit based on the number of grooves to be formed and performs the scanning while causing the blades to perform the scanning of the formed grooves based on the number of the extra grooves with respect to the number of the grooves to be formed in the number of the scans of the first lens forming unit.

12. The apparatus used for manufacturing a lens array according to claim 1, further comprising:
a second lens forming unit that includes (i) at least one blade for forming the partition walls, and (ii) nozzles discharging the polymer,
wherein the scanning control unit determines the number of scans of the first lens forming unit based on the number of grooves to be formed and sets the additional number of the grooves with respect to the number of the grooves to be formed in the number of the scans of the first lens forming unit as the number of the scans of the second lens forming unit to perform the scanning.

13. The apparatus used for manufacturing a lens array according to claim 2, further comprising:
a second lens forming unit that includes (i) at least one blade for forming the partition walls, and (ii) nozzles discharging the polymer,
wherein the scanning control unit determines the number of scans of the first lens forming unit based on the number of grooves to be formed and sets the additional number of the grooves with respect to the number of the grooves to be formed in the number of the scans of the first lens forming unit as the number of the scans of the second lens forming unit to perform the scanning.

14. A method used in manufacturing a lens array comprising:
detecting a position of a parallax image;
providing a lens forming unit that includes (i) a plurality of blades for forming a plurality of partition walls, and (ii) a plurality of nozzles discharging a polymer; and
scanning the lens forming unit in a first scan to form first partition walls using the blades,
scanning the lens forming unit in a second scan that is next to the first scan to form second partition walls using the blades,
prior to at least the second scan, determining a distance between the first partition walls and the second partition walls based on the detected position of the parallax image, and
discharging the polymer by the nozzles to a region between the first partition walls and the second partition walls on a surface of a polymer substrate having the parallax image.

15. A method used in manufacturing a lens array comprising:
detecting a position of a parallax image;
providing a lens forming unit that includes (i) a plurality of blades for forming a plurality of partition walls, and (ii) a plurality of nozzles discharging a polymer;
scanning the lens forming unit in a first scan to form first partition walls using the blades,
scanning the lens forming unit in a second scan that is next to the first scan to form second partition walls using the blades,
prior to at least the second scan, determining a distance between the first partition walls and the second partition walls based on the detected position of the parallax image, adjusting an angle of the lens forming unit with respect to a scanning direction based on the detected position of the parallax image, and discharging the polymer by the nozzles to a region between the first partition walls and the second partition walls on a surface of a polymer substrate having the parallax image.

16. The apparatus used for manufacturing a lens array according to claim 1, wherein the scanning unit adjusts the distance such that a crosstalk caused by a positional error between a lens made from the polymer and the parallax image is reduced.

* * * * *